3,047,582
PHTHALOCYANINE-SULFONAMIDES AND -CARBONAMIDES
Berthold Bienert, deceased, late of Leverkusen-Bayerwerk, Germany, by Hildegard Bienert, Leverkusen-Bayerwerk, Germany; Dorothea Hildegard Prochaska, Rock Hill, S.C.; and Berthold Klaus Bienert, Leverkusen-Bayerwerk, Germany, heirs; Kurt Breig, Manfred Groll, and Heinrich Gutjahr, all of Koln-Stammheim, Germany, assignors to Farbenfabriken Bayer Aktiengesellschaft, Leverkusen, Germany, a corporation of Germany
No Drawing. Filed July 15, 1960, Ser. No. 43,249
Claims priority, application Germany Apr. 20, 1957
4 Claims. (Cl. 260—310)

The present invention relates to new phthalocyanine dyestuffs and to a process for their manufacture; more particularly it relates to phthalocyanine dyestuffs corresponding to the formula $$Pc(X-R_1)_n$$

In this formula Pc stands for a phthalocyanine radical, X means a $-SO_2-$ or $-CO-$ group, $R_1$ stands for an amino group containing radical of the benzene, naphthalene, arylpyrazole and acylacetic acid arylamide series, being linked to the radical X via the amino group and bearing an esterified hydroxyl group adjacent to a carbon atom which in adjacent position to the unesterified hydroxyl group is capable of coupling with a diazonium compound, and $n$ stands for an integer from 1 to 4.

In accordance with the invention it has been found that valuable phthalocyanine derivatives are obtainable by reacting phthalocyanine-sulfonic acid halides or -carboxylic acid halides, with esters of coupling hydroxy compounds which contain in the molecule primary or secondary amino groups.

As phthalocyanines there may be used metal-free phthalocyanines as well as those possessing a metal as central atom, preferably copper, nickel or cobalt. The phthalocyanines may contain the sulfonic acid halide and carboxylic acid halide groups in the benzene nuclei of the macrocyclic ring or in anellated aromatic rings or in aryl radicals which are linked either directly or via bridge atoms such as e.g. $-CO-$, $-SO_2-$ or $-NH$, with the macrocyclic phthalocyanine ring.

In addition to the sulfonic acid halide and carboxylic acid halide groups, the phthalocyanine radicals may also exhibit other, non-ionic substitutents such as halogen, nitro, alkyl, alkoxy or acylamino groups.

The amines containing ester groups which are reacted with the acid halide groups of the phthalocyanine molecule, are preferably derived from primary or secondary amines of the benzene, naphthalene, acylacetic acid amide and arylpyrazole series. As coupling hydroxy compounds they are, therefore, based upon aminophenols, aminonaphthols, aminonaphthol-carboxylic acid arylide amides, aminoacylacetic acid amides, acylacetic acid aminoarylamides or amino group containing arylpyrazolones, especially 1-phenyl-pyrazolones-5.

The esterification of the hydroxy compounds may be carried out according to conventional processes such as e.g. with acetyl chloride, benzoyl chloride or benzenesulfonic acid chloride or more particularly with chloroformic acid ethyl ester or chlorosulfonic acid. The esterified compounds are not capable of being coupled with diazonium compounds. They may be converted, however, into coupling components by saponification of the esterified hydroxyl group.

In the reaction of the amines containing ester groups with the phthalocyanine derivatives there may react either all or only some of the acid halide groups of the phthalocyanine with the amine groups of the ester group containing amines. Acid halide groups which do not react with the ester amines may be converted with, if desired, ammonia or other non-coupling amines. If desired, unreacted sulfonic acid halide or carboxylic acid halide groups of the phthalocyanine molecule, may subsequently be saponified so that a cleavage of the ester group of the amino group-containing components may occur at the same time.

The reaction of the phthalocyanine acid halides, with the amines to be used according to definition is advantageously performed in an organic medium such as chlorobenzene, pyridine, nitrobenzene, alcohols or dimethylformamide in order to prevent a hydrolysis of the acid halide groups.

The phthalocyanine sulfonic acid chlorides technically obtainable in an especially easy manner, may also be reacted with the ester amines in the form of moist pastes, organic solvents such as ketones or aromatic halogenated hydrocarbons serving at the same time as solvent for the ester amine and sulfochloride. The good solubility in organic solvents of the ester group-containing amines and their reaction products permits the production of very pure compounds without incurring any significant hydrolysis of the acid halide groups.

Arylpyrazolone esters substituted in the aryl radical by a secondary amino group, are obtainable by reacting arylpyrazolone esters substituted in the aryl radical by a primary amino group, with organic carbonyl group-containing compounds and hydrogenating the reaction products. Suitable organic carbonyl group-containing compounds are especially aliphatic or aromatic aldehydes. The reaction is advantageously carried out in an inert solvent. In general it is not necessary for this purpose to isolate the reaction product with the organic carbonyl group-containing compounds since, in general, the resultant reaction mixture may be subjected to hydrogenation.

The esters initially obtained according to the process may readily be saponified with alkaline agents, such as methanolic sodium hydroxide solution or dilute pyridine and sodium hydroxide solution. These products are suitable for dyestuffs, for example, for dyeing and printing cotton or for use in spinning solutions of man-made fibres or for the dyeing of plastics. They may especially be used as coupling components for the building up of azo dyestuffs.

The following examples are given for the purpose of illustrating the invention without, however, limiting it thereto.

*Example 1*

21.9 parts by weight of 1-(3'-nitrophenyl)-3-methylpyrazolone-(5) are dissolved with 4 parts by weight of sodium hydroxide and 5 parts by weight of sodium carbonate in 500 millilitres of water. Into the resultant solution there are added dropwise within 1 hour 17.6 parts by weight of benzene sulfonic acid chloride. The pyrazolone ester separates first as an oil, but solidifies when stirred overnight and can be filtered with suction. The reduction of the nitro group is carried out in alcoholic solution using Raney nickel in conventional manner. The 1-(3'-aminophenyl)-3-methylpyrazolone-(5)-benzene sulfonic acid ester so obtained melts at 90–91° C. In analogous manner there may be obtained the p-toluene sulfonic acid ester, and from 1-(4'-nitrophenyl)-3-methylpyrazolone-(5) the 1-(4'-aminophenyl)-3-methylpyrazolone-(5)-benzene sulfonic acid ester.

27 parts by weight of the p-toluene sulfonic acid ester of 1-(3'-aminophenyl)-3-methyl-5-pyrazolone are introduced into 90 parts by weight of pyridine and treated with 19.4 parts by weight of Ni-phthalocyanine-(3)-tetrasulfochloride. After the reaction is completed, the melt is stirred into ethanol, filtered off by suction and washed with ethanol.

The reaction of the pyrazolone ester with the phthalocyanine sulfochloride may also be performed in inert solvents such as chlorobenzenes.

The reaction product thus obtained is saponified in conventional manner with sodium hydroxide solution, with, is desired, the addition of a little pyridine, precipitated with acid, suction-filtered, washed and dried. In this way, an especially pure sulfonamide is obtained. The product is a blue powder which dyes cotton in blue shades.

The phthalocyanine sulfonamide obtainable according to this example can be applied to the preparation of a green print in accordance with the following procedure:

The coupling component is mixed with an amount equivalent to its coupling power with the diazoamino compound prepared from diazotized 1-amino-2-methyl-4,5-dichlorobenzene and 2-ethylamino-5-sulfobenzoic acid. 60 parts by weight of this mixture are stirred with 100 parts by volume of a diluted sodium hydroxide solution (concentrated sodium hydroxide at 38° Bé. diluted in the proportion 1:10). The solution is stirred into a mixture of 500 parts by weight of starch-tragacanth thickening and 240 parts by volume of water. This printing paste yields on cotton or regenerated cellulose a green print by neutral or acid steaming.

In a similar manner the phthalocyanine-sulfonamide and -carbonamide coupling components obtained according to the following examples may be applied to the preparation of prints on cotton or regenerated cellulose.

An azo pigment dyestuff can be prepared in the following manner:

0.1 mol of 2,5-dichloroaniline is diazotized in usual manner with 32.5 parts by volume hydrochloric acid (34% by volume) and 6.9 parts by weight of sodium nitrite, and purified by the addition of filtering charcoal, 0.1 mol of the saponified condensation product from 1-(3'-aminophenyl) - 3 - methyl-5-pyrazolone-p-toluene-sulfonic acid ester and Ni-phthalocyanine-3-tetrasulfochloride are dissolved in water with the addition of a little sodium hydroxide. After the above-specified diazo-solution is run in, the mixture is slowly heated to 40° C. The coupling is completed after a short time, and the dyestuff can be filtered off by suction. A green pigment dyestuff is obtained which is very fast to solvents.

Example 2

Into 90 parts by weight of pyridine there are introduced 27 parts by weight of the benzene sulfonic acid ester of 1-(3'-aminophenyl)-3-methyl-5-pyrazolone obtainable according to the instructions of Example 1, and subsequently 19.4 parts by weight of Ni-phthalocyanine-(3)-tetrasulfochloride. After the reaction is completed, the melt is stirred in ethanol, suction-filtered and washed with ethanol. A blue powder is thus obtained which readily dissolves in organic solvents such as acetone, o-dichlorobenzene, nitrobenzene or dimethyl formamide and may be saponified according to the instructions given in Example 1.

If instead of 1-(3' - aminophenyl)-3-methyl-5-pyrazolonebenzene sulfonic acid esters there are used 38 parts by weight of 3-aminobenzoyl-acetic acid anilide-O-benzenesulfonic acid ester, a reaction product with similar properties is obtained.

The 3-aminobenzoyl-acetic acid anilide-O-benzenesulfonic-acid ester is obtained as follows:

27 parts by weight of benzene-sulfochloride are added dropwise with vigorous stirring to a solution of 28.5 parts by weight of 3-nitrobenzoyl-acetic acid anilide in 100 parts by volume of pyridine. After about 2 hours the reaction mixture is poured into 1 l. of water, the reaction product initially precipitating as in oil. By recrystallising from alcohol, the 3-nitrobenzoyl-acetic acid anilide-O-benzene-sulfonic acid ester is obtained in pure form (M.P.: 160–160° C.). By reduction of the nitro group with Raney nickel in tetrahydrofurane the corresponding amino compound is formed.

Example 3

Into 100 parts by weight of chlorobenzene there are first introduced 17 parts by weight of the benzene sulfonic acid ester of 1-(3'-aminophenyl)-3-methyl-5-pyrazolone obtainable according to Example 1, and subsequently 9.63 parts by weight of Ni-phthalocyanine-(3)-tetrasulfochloride. 3.2 parts by weight of pyridine are added thereto and the mixture is stirred at room temperature or slightly elevated temperature until completion of the reaction. The reaction product is precipitated with alcohol, suction-filtered and washed. The blue powder thus obtained is readily soluble in organic solvents and saponified as indicated in Example 1.

Instead of the benzene sulfonic acid ester of 1-(3'-aminophenyl)-3-methyl-5-pyrazolone there may also be used with similar results the ester of 1-(4'-aminophenyl)-3-methyl-5-pyrazolone. The nickel phthalocyanine-(3)-tetrasulfochloride may be replaced by the copper phthalocyanine-(3)-tetrasulfochloride, and the pyridine by other suitable acid-binding agents such as triethylamine, sodium acetate or an excess of the ester itself.

Instead of chlorobenzene there may also be used other solvents such as o-dichlorobenzene, acetone or methyl ethyl ketone.

Example 4

Into 100 parts by weight of chlorobenzene there are introduced 17 parts by weight of the benzene sulfonic acid ester of 1'(4'-aminophenyl)-3-methyl-5-pyrazolone obtainable according to the instruction given in Example 1, 4.0 parts by weight of sodium bicarbonate and then at a low temperature 9.63 parts by weight of Ni-phthalocyanine-(3)-tetrasulfochloride in the form of an aqueous paste. The mixture is stirred until the reaction is completed and the reaction product obtained is precipitated with methanol, suction-filtered and then briefly washed with methanol.

After drying, the compound thus obtained is a blue powder which readily dissolves in organic solvents such as acetone, o-dichlorobenzene, nitrobenzene or dimethyl formamide.

The saponification of the ester is performed in analogous manner to Example 1 in a methanolic sodium hydroxide solution. The saponified product is subsequently precipitated with acid, suction-filtered and washed neutral. A blue powder is thus obtained which dyes cotton in blue shades.

A cotton fabric is printed with the printing paste described below by machine, screen, or block printing methods, dried, passed through a developing bath containing a diazo-compound.

After squeezing, the dyed fabric is passed through a rinsing bath and then drawn through a hot bath containing 15 parts by volume of sodium bisulfite at 38° Bé. per litre. Rinsing and hot soaping follows. A bright green print is obtained. By printing of various naphthols side-by-side a multi-color effect is attained.

Composition of the printing paste:

20 parts by weight of the saponified phthalocyanine sulfonamide obtained according to this example
30 parts by weight of monopol brilliant oil
50 parts by weight of alcohol
25 parts by weight of sodium hydroxide (38° Bé)
375 parts by weight of water
500 parts by weight of starch-tragacanth thickening 1000 parts by weight

Example 5

Into a mixture cooled to −10° to −15° C. of 110 parts by weight of chlorobenzene, 15.1 parts by weight of 1 - (4' - aminophenyl)-3-methyl-5-pyrazolone-benzene sulfonic acid ester and 4.0 parts by weight of sodium bicarbonate there is stirred a moist paste of 11.6 parts by weight of copper phthalocyanine-(3)-trisulfochloride. Stirring is subsequently continued for 24 hours at −10° to 0° C., for 24 hours at 0–30° C. and for 4 hours at 30–35° C.

The reaction mixture is immediately stirred into an excess of sodium hydroxide solution in order to saponify the so formed ester. After saponification and neutralisation of the sodium hydroxide solution, the chlorobenzene is driven off by steam. The pyrazolone derivative which separates in a readily filterable form, is suction-filtered, washed with hot water and dried. The dyestuff worked up according to the pigment printing process, yields on cellulose blue prints.

If instead of copper phthalocyanine-(3)-trisulfochloride there are used in this Example 9.7 parts by weight of copper phthalocyanine-(4)-tetrasulfochloride in the form of a moist paste, a pigment dyestuff is obtained which printed on cotton according to the pigment printing process, yields blue prints.

If instead of copper phthalocyanine-(4)-tetrasulfochloride there are used 9.65 parts by weight of nickel-phthalocyanine-(4)-tetrasulfochloride in the form of a moist paste, a very pure end product is obtained in good yield which dissolves in dilute sodium hydroxide solution with a bluish green coloration.

Instead of 1 - (4'-aminophenyl)-3-methyl-(5)-pyrazolone-benzene sulfonic acid ester there may be used for the processes of this example, 1-(3'-aminophenyl)-3-methyl-(5)-pyrazolone-benzene sulfonic acid ester. There are also obtained very pure end products in very good yield. They readily dissolve in dilute sodium hydroxide solution with a bluish green coloration.

*Example 6*

Into 120 parts by weight of dry pure pyridine there are introduced at about 15° C. while cooling with water 13.0 parts by weight of 1-(4'-ethyl-aminophenyl)-3-methyl-(5)-pyrazolone-benzene-sulfonic acid ester and subsequently 7.24 parts by weight of dry nickel phthalocyanine-(3)-tetrasulfochloride. After stirring at room temperature for 24 hours and at 30–35° C. for 4 hours, about 75 parts by weight of pyridine are distilled off in vacuo and the reaction product is precipitated from the residual solution with methanol. The dyestuff is filtered off by suction, and washed with methanol and hot water until the discharge is colorless. The pigment dyestuff is obtained in good yield and may be saponified in a mixture of pyridine and water with sodium hydroxide solution. Prior to saponification, the condensation product is readily soluble in organic solvents such as chlorobenzene, pyridine, o-dichlorobenzene and dimethylformamide.

1 - (4' - ethylaminophenyl)-3-methyl-(5)-pyrazolone-benzene-sulfonic acid ester may be prepared as follows:

32.9 grams of 1-(4'-aminophenyl)-3-methyl-pyrazolone-5-benzene-sulfonic acid ester prepared by reduction of the corresponding 4'-nitrophenyl compound, are dissolved in 400 millilitres of alcohol. To the solution there are added 6 millilitres of acetaldehyde and 0.8 gram of Raney nickel.

The absorption of hydrogen starts at 50° C. By further heating to 60° C., the reaction is completed. After removal of the catalyst, the alcoholic hydrogenation solution is poured with stirring into ice water, whereby the product initially precipitates in an oily form. After stirring for about one hour, a solid product is obtained which may readily be filtered off by suction. 1-(4'-ethylaminophenyl)-3-methyl-pyrazolone - (5) - benzene-sulfonic acid ester is thus obtained. After drying, the compound has a melting point of 58–62° C. After recrystallisation from petroleum ether, colorless needles are obtained which melt at 66–67° C.

If instead of 1-(4'-aminophenyl)-3-methyl-pyrazolone-(5)-benzene-sulfonic acid ester there is used 1-(3'-aminophenyl)-3-methylpyrazolone - (5) - benzene-sulfonic acid ester, 1 - (3'-ethylaminophenyl)-3-methylpyrazolone-(5)-benzene-sulfonic acid ester is obtained in analogous manner; this compound may also be condensed according to the process described above with nickel phthalocyanine-(3)-tetrasulfochloride and the condensation product subsequently saponified.

Similar condensation products are obtainable by using 1 - (4' - propyl- or 4'-benzylaminophenyl)-3-methyl-(5)-pyrazolone-benzene-sulfonic acid ester instead of 1-(4'-ethyl-aminophenyl) - 3 - methyl-(5)-pyrazolone-benzene-sulfonic acid ester.

1-(4'-propyl- or -4'-benzylaminophenyl)-3-methyl-5-pyrazolone benzene-sulfonic acid ester are obtainable by hydrogenating according to the above process 32.9 grams of 1-(4'-aminophenyl)-3-methyl-pyrazolone-(5)-benzene-sulfonic acid ester, with 7.8 millilitres of propionaldehyde or equivalent parts of benzaldehyde. There are obtained 1 - (4' - propylaminophenyl) - 3 - methyl - pyrazolone - (5)-benzene-sulfonic acid ester (upon recrystallisation from petroleum ether colorless crystals, M.P. 70–71° C.) and 1-(4'-benzylaminophenyl)-3-methyl-pyrazolone-(5)-benzene-sulfonic acid ester (redissolved from ligroin M.P. 90–92° C.).

*Example 7*

Into a mixture of 175 parts by weight of dioxan, 40 parts by weight of acetone, 26.4 parts by weight of 1-(4'-aminophenyl) - 3 - methyl - 5 - pyrazalone - benzene - sulfonic acid ester and 6.6 parts by weight of sodium bicarbonate, there is introduced at 0 to 10° C. a moist paste of an aza-nickel-phthalocyanine-sulfochloride formed from 23.3 parts by weight aza-nickel-phthalocyanine-sulfonic acid obtained in known manner according to the urea process from 2 mols of pyridine-2,3-dicarboxylic acid and 2 mols of 4-sulfophthalic acid, by treatment with chlorosulfonic acid and thionylchloride at elevated temperature.

The mixture is stirred consecutively at −5 to 0° C. for 24 hours, at 0 to 30° C. for 10 hours and at 30–35° C. for 2 hours. 16 parts by weight of pyridine are then added and stirring continued at 30° C. for a further 2 hours.

The reaction mixture is filtered and the ester precipitated from the filtrate with water. After suction-filtration and washing with water, the product can be saponified in a 10 percent mixture of pyridine and water with sodium hydroxide solution. The phthalocyanine-pyrazolone derivative which readily dissolved in dilute sodium hydroxide solution with a blue color, may be used as a blue dyestuff for pigment printing.

Similar products are obtained by introducing sulfochloride groups into the benzene nuclei of the nickel or copper phthalocyanine obtained from 2 mols of pyridine-2,3-dicarboxylic acid and 2 mols of phthalic acid anhydride with chlorosulfonic acid thionylchloride, and using the products thus obtained instead of the sulfochlorides used as described above.

The pyrazolone used in this example can also be esterified with acetyl chloride, benzoyl chloride, chloroformic acid ethyl ester or with chlorosulfonic acid.

*Example 8*

24.8 parts by weight of 4-aminophenol-benzene-sulfonic acid ester are dissolved in 650 parts by weight of o-dichlorobenzene and cooled to 15° C. Upon the addition of 10.1 parts by weight of sodium bicarbonate there are introduced at about 15° C. while cooling with water, 19.3 parts by weight of nickel-phthalocyanine-(3)-tetrasulfochloride in the form of a moist paste. The mixture is stirred consecutively at 15° C. for 24 hours and at 30–35° C. for 4 hours. The precipitated reaction product is filtered off by suction, washed with benezene and ligroin and dried. In order to remove soluble salts, it is thoroughly stirred for 1 hour with 800 parts by weight of water, suction-filtered, washed with water and dried. The resultant ester dissolves in concentrated sulfuric acid with a dull yellowish green color and separates upon stirring the sulfuric acid solution in water in the form of bluish green flakes. It can be saponified with a mixture of pyridine, water and sodium hydroxide solution.

4-aminophenol-benzene-sulfonic acid ester is obtainable by reacting benzene-sulfochloride on 4-acetyl-aminophenol in pyridine at 10° C. and subsequently heating the reaction mixture consecutively to 60° C. for ½ hour and to slight boiling for a further ½ hour. The solution is poured into ice water whereby the product solidifies after brief stirring. After suction-filtration and drying, 4-acetyl-amino-phenol-benzene-sulfonic acid ester is obtained having a melting point 122–123° C. The product may be saponified with alcoholic hydrochloric acid to form the amino compound which melts after recrystallisation from alcohol at 100–101° C.

If instead of 4-aminophenol-benzene sulfonic acid ester there are used equimolecular quantities of 1-amino-7-naphtholbenzene sulfonic acid ester, a reaction product with similar properties is obtained.

*Example 9*

Into a solution of 25.6 parts by weight of 1-(4'-aminophenyl) - 3 - methyl - 5 - pyrazolone - benzene sulfonic acid ester in 100 parts by weight of chlorobenzene there are introduced at 10–15° C. 6 parts by weight of sodium bicarbonate and 18.6 parts by weight of 4,5-dichloro-nickel-phthalocyanine-(3)-trisulfochloride in the form of a moist paste. The mixture is stirred at 15–35° C. until the reaction is completed and the reaction product is precipitated with ligroin. It may be saponified in a mixture of pyridine and water with dilute sodium hydroxide solution.

By replacing 1-(4'-aminophenyl)-3-methyl-5-pyrazolone-benzene-sulfonic acid ester by the corresponding 1-(3'-aminophenyl) derivative, a similar product is obtained. The two dyestuffs may be used for pigment printing.

Similar reaction products are obtained if instead of the reactants mentioned in paragraph 1, there are used 18.1 parts by weight of 4,5,4',5'-tetrachloro-nickel-phthalocyanine-3'',3'''-disulfochloride, 4 parts by weight of sodium bicarbonate and 17.1 parts by weight of 1-(4'-aminophenyl)-3-methyl-5-pyrazolone-benzene-sulfonic acid ester or 18.2 parts by weight of 4,5,4',5'-tetrachloro-Cu-phthalocyanine-3'',3'''-disulfochloride, 4 parts by weight of sodium bicarbonate and 17.1 parts by weight of 1-(4'-aminophenyl) - 3 - methyl - 5 - pyrazolone benzene sulfonic acid-ester. The phthalocyanine-sulfochloride substituted by chlorine can be obtained in known manner from mixture of chloro-substituted phthalodinitriles and phthalodinitrile and by treating the resulting pigments with chloro-sulfonic acid.

*Example 10*

Into a solution of 33.4 parts by weight of 1-(4'-methyl-aminophenyl) - 3 - methyl - 5 - pyrazolone - p - toluene - sulfonic acid ester in 100 parts by weight of dry pyridine there are introduced at 0–5° C. 10.0 parts by weight of Cu-phthalocyanine-(4)-tetracarboxylic acid chloride (obtained from the sodium salt of Cu-phthalocyanine-(4)-tetracarboxylic acid and phosphorus pentachloride in nitrobenzene at 120–130° C.). The mixture is stirred for 48 hours, the reaction product then filtered and poured into 5 litres of water and again filtered after heating the solution to 60° C. The precipitate thus obtained is washed with water, purified by stirring with hydrochloric acid and again filtered. The product can be saponified as indicated in Example 1.

Instead of Cu-phthalocyanine-(4)-tetracarboxylic acid chloride there may be used in an analogous manner nickel-phthalocyanine-(4) or (3)-tetracarboxylic acid chloride, nickel-phthalocyanine-(4) or (3)-tricarboxylic acid chloride or copper phthalocyanine-(4) or (3)-tricarboxylic acid chloride.

*Example 11*

24 parts by weight of 1-(4'-aminophenyl)-3-methyl-pyrazolyl (5)-ethyl-carbonate, 8 parts by weight of sodium bicarbonate and 19.4 parts by weight of nickel-phthalocyanine-3,3', 3'', 3'''-tetrasulfochloride are introduced into 80 parts by weight of dimethylformamide at −5° C. The temperature is slowly raised with stirring to 20° C., the mixture is stirred at this temperature for 18 hours and then at 30° C. briefly. The melt is poured into water, stirred with hydrochloric acid and the reaction product filtered off with suction. Thereupon the reaction product is saponified with sodium hydroxide solution in pyridine water, acidified, filtered off with suction and washed neutral. The reaction product dissolves in dilute sodium hydroxide solution with blue-green coloration.

1 - (4' - aminophenyl) - 3 - methyl - pyrazolyl - (5)-ethylcarbonate is obtained as follows:

21.9 parts by weight of 1-(4'-nitrophenyl)-3-methyl-pyrazolone-5 are suspended with 4 parts by weight of sodium hydroxide and 5 parts by weight of soda in 300 parts by weight of water. 12 parts by weight of ethyl-chloroformate are slowly added into the suspension with stirring at 0–5° C. After stirring for 3 hours the reaction product is filtered off with suction and washed with water. The 1-(4'-nitrophenyl)-3-methyl-pyrazolyl-5-ethylcarbonate obtained melts at 85 to 86° C. after recrystallizing from alcohol. By reduction with Raney nickel in methanol 1 - (4' - aminophenyl) - methyl - 3 - pyrazolyl - 5-ethylcarbonate is obtained.

*Example 12*

21 parts by weight of 1-[4'-(3''-aminobenzoyl)-aminophenyl] - 3 - methylpyrazolone - (5) - benzenesulfonic acid ester, 4 parts by weight of sodium bicarbonate and 9.7 parts by weight of nickel phthalocyanine-3,3',3'',3'''-tetrasulfochloride are introduced in form of an aqueous paste into 50 parts by weight of tetrahydrofuran at 10–15° C. The reaction mixture is stirred first at 15 to 20° C. for some hours, thereupon at 30–35° C., the melt is poured into methanol and filtered off with suction.

The reaction product is saponified by pouring into 100 parts by weight of pyridine water (25%), 23 parts by weight of sodium hydroxide solution (d.=2.36) are added, the mixture is stirred at 15–20° C. for 4 hours, the reaction product precipitated with acid, filtered off with suction and washed neutral. The reaction product obtained dissolves in dilute sodium hydroxide solution with blue-green coloration.

Instead of 1-[4'-(3''-aminobenzoyl)-aminophenyl]-3-methylpyrazolone - 5 - benzenesulfonic acid ester, - 1-[3' - (3'' - aminobenzoyl) - aminophenyl] - 3 - methyl-pyrazolone-5-benzenesulfonic acid ester can be used with similar result.

The pyrazolone esters mentioned in this Example are obtained as follows:

32.9 parts by weight of 1-(4'-aminophenyl)-3-methyl-pyrazolone-5-benzenesulfonic acid ester are dissolved in 120 parts by weight of acetone and 10 parts by weight of pyridine. A solution of 18.5 parts by weight of 3-nitro-benzoylchloride in 40 parts by weight of acetone are slowly added dropwise to the solution at room temperature. After stirring for 2 hours the solution is poured into 500 parts by weight of water, 1-[4'-(3''-nitrobenzoyl)-aminophenyl] - methyl - 3 - pyrazolone - 5 - benzenesulfonic acid ester precipitating thereby. After recrystallizing from alcohol the compound melts at 168 to 169° C. By reduction with Raney nickel in tetrahydrofuran, 1-[4' - (3'' - aminobenzoyl) - aminophenyl] - methyl - 3-pyrazolone-5-benzenesulfonic acid ester is obtained which melts at 163 to 164° C. After recrystallizing from alcohol.

When using 1-(3'-aminophenyl)-3-methylpyrazolone-5-benzenesulfonic acid ester instead of 1-(4'-aminophenyl)-3-methyl-pyrazolone-5-benzenesulfonic acid ester, 1-

[3' - (3" - aminobenzoyl) - aminophenyl] - methyl - 3-pyrazolone-5-benzenesulfonic acid ester is obtained in the same manner, which melts at 141 to 142° C. after recrystallizing from alcohol.

*Example 13*

20 parts by weight of the condensation product of 1 mol of nickel-phthalocyanine-(3)-tetra-sulfochloride and 3 mols of 1-(4'-aminophenyl)-3-methyl-5-pyrazolone are pasted up with a mixture consisting of 40 parts by volume of alcohol and 20 parts by volume of cold water. Thereupon there are added 10 parts by volume of sodium hydroxide solution (38° Bé.) and 600 parts by volume of hot water to which were added 20 parts by volume of Turkey red oil. The solution is made up to 1 l. by the addition of hot water. This padding solution is used to impregnate piece goods of cotton or regenerated cellulose on a two-roller padding machine; the goods thus treated are then intermediately dried in a hot-air drying machine (hotflue). The intermediately dried goods are developed in usual manner in a dyeing bath containing 8.4 parts by weight/l. of diazotized o-chloroaniline. A very clear brilliant green is obtained which can be used for plain color as well as for white and colored discharges.

This application is a continuation-in-part of our application Serial No. 728,517, filed on April 15, 1958, and now abandoned.

We claim:
1. A phthalocyanine dyestuff of the formula

$$Pc(X-R_1)_n$$

wherein Pc stands for a phthalocyanine radical, X means a radical selected from the group consisting of $-SO_2-$ and $-CO-$, $R_1$ stands for an amino group containing radical selected from the group consisting of the benzene, naphthalene, arylpyrazole and acylacetic acid arylamide series, said amino group containing radical being linked to the radical X via the amino group and bearing an esterified hydroxyl group adjacent to a carbon atom which in adjacent position to the unesterified hydroxyl group is capable of coupling with a diazonium compound, and $n$ stands for an integer from 1 to 4.

2. A phthalocyanine dyestuff of the formula

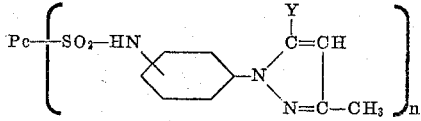

where Pc stands for a phthalocyanine radical, Y is an esterified hydroxyl group and $n$ stands for an integer from 1 to 4.

3. The compound of the formula

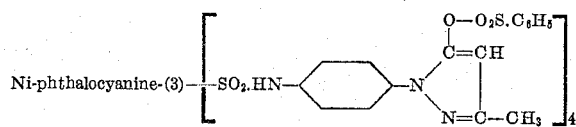

4. An ester of the compound having the formula

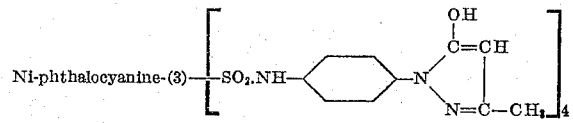

References Cited in the file of this patent
UNITED STATES PATENTS
2,873,280    Bienert et al. _____ Feb. 10, 1959